US011187516B2

(12) United States Patent
Mitterreiter

(10) Patent No.: US 11,187,516 B2
(45) Date of Patent: Nov. 30, 2021

(54) ANGLE MEASURING DEVICE

(71) Applicant: DR. JOHANNES HEIDENHAIN GmbH, Traunreut (DE)

(72) Inventor: Johann Mitterreiter, Chieming (DE)

(73) Assignee: DR. JOHANNES HEIDENHAIN GMBH, Traunreut (DE)

( * ) Notice: Subject to any disclaimer, the term of this patent is extended or adjusted under 35 U.S.C. 154(b) by 47 days.

(21) Appl. No.: 16/920,616

(22) Filed: Jul. 3, 2020

(65) Prior Publication Data
US 2021/0003379 A1 Jan. 7, 2021

(30) Foreign Application Priority Data

Jul. 4, 2019 (DE) ...................... 10 2019 209 862.2

(51) Int. Cl.
*G01B 7/30* (2006.01)
*G01D 5/14* (2006.01)
*G01D 5/16* (2006.01)

(52) U.S. Cl.
CPC ............... *G01B 7/30* (2013.01); *G01D 5/142* (2013.01); *G01D 5/16* (2013.01)

(58) Field of Classification Search
CPC . G01B 7/30; G01B 7/00; G01B 11/26; G01B 11/00; G01B 3/56; G01B 5/24; G01B 13/18; G01B 21/22; G01D 5/142; G01D 5/16; G01D 2205/90; G01D 5/34792; G01D 5/2451; G01D 5/34738; G01D 5/24485;

(Continued)

(56) References Cited

U.S. PATENT DOCUMENTS

2006/0043964 A1 3/2006 Watanabe et al.
2006/0277771 A1 12/2006 Mitterreiter
(Continued)

FOREIGN PATENT DOCUMENTS

CN 112240781 A * 1/2021 ......... G01D 5/34715
DE 10 2006 020067 A1 12/2006
(Continued)

OTHER PUBLICATIONS

European Search Report issued in corresponding EP Patent Application No. 20163911.9, dated Nov. 5, 2020, pp. 1-2.

*Primary Examiner* — Son T Le
(74) *Attorney, Agent, or Firm* — Carter, Deluca & Farrell LLP

(57) ABSTRACT

An angle measuring device includes first and second component groups and a bearing. The first component group includes a scale element having first and second graduations. The second component group has a first modular unit, having a position sensor, a second modular unit, having first to sixth position transducers, and a compensation coupling. To determine the relative angular position between the component groups, the first graduation is scannable with the aid of the position sensor. Using the first to third position transducers, the first graduation or a further graduation disposed on the scale element is scannable to determine a displacement of the scale element in a plane. Using the fourth to sixth position transducers, the second graduation is scannable to determine tilting of the scale element about a tilting axis, the position sensor being situated in a torsionally stiff but axially and radially flexible manner relative to the position transducers.

11 Claims, 6 Drawing Sheets

(58) Field of Classification Search
CPC ........ B23Q 17/22; H02K 11/21; H02K 7/003; H03M 1/645; H03M 1/00; H03M 1/22; H03M 1/26; H03M 1/301; H03M 1/305; H03M 1/485; H03M 1/0617; H03M 1/1066; H03M 1/143; H03M 1/161; H03M 1/30; H03M 1/303; H03M 1/308; H03M 1/50; H03M 1/64
See application file for complete search history.

(56) References Cited

U.S. PATENT DOCUMENTS

| | | | | |
|---|---|---|---|---|
| 2011/0140690 | A1* | 6/2011 | Antraygue | G05G 1/04 324/207.25 |
| 2019/0390984 | A1 | 12/2019 | Oohata | |
| 2020/0370927 | A1* | 11/2020 | Watanabe | G01D 5/24438 |

FOREIGN PATENT DOCUMENTS

| | | | | |
|---|---|---|---|---|
| EP | 2489988 A2 | 8/2012 | | |
| JP | 2010-217167 A | 9/2010 | | |
| WO | 2018/150833 A1 | 8/2018 | | |
| WO | WO-2019039131 A1 * | 2/2019 | .............. | B25J 11/00 |

\* cited by examiner

ANGLE MEASURING DEVICE

CROSS-REFERENCE TO RELATED APPLICATIONS

The present application claims priority to Application No. 10 2019 209 862.2, filed in the Federal Republic of Germany on Jul. 4, 2019, which is expressly incorporated herein in its entirety by reference thereto.

FIELD OF THE INVENTION

The present invention relates to an angle measuring device, e.g., having a scale element for measuring a relative angular position as well as lateral displacements and tilting of the scale element.

BACKGROUND INFORMATION

Such angle measuring devices, for example, can be installed on spindles or rotary tables. These spindles or rotary tables are frequently used in machining equipment or machining centers. Spindles or motor spindles in machine tools often hold a rotating tool such as a milling tool. Workpieces which are processed by chip removal, for example, are fixed in place on rotary tables. In addition, rotary tables are used in measuring machines, in which case a workpiece is measured that is fastened to the rotary table. Angle measuring devices are used especially in machine tools or measuring machines for measuring rotatory movements. There is an increasing demand to increase the capability of such spindles or rotary tables, in particular to increase the precision during the operation.

Japanese Patent Document No. 2010-217167 describes a measuring device having an encoder which is able to measure the rotary frequency of a driving collar and also generates signals that allow inferences to be drawn about an axial loading of the driving collar.

SUMMARY

Example embodiments of the present invention provide an angle measuring device which allows the position of an axis of rotation to be determined in multiple directions during an ongoing operation.

According to an example embodiment of the present invention, an angle measuring device includes a first component group, a second component group, and a bearing. The component groups are positioned so that they are able to rotate relative to each other about an axis of rotation using the bearing or with the aid of the bearing. The first component group includes a scale element, which has a first graduation as well as a second graduation and optionally another graduation. The second component group has a first modular unit, which in turn has at least one position sensor, which is situated opposite the scale element separated by an air gap. In addition, the second component group has a second modular unit, which has a first, second, third, fourth, fifth, and sixth position transducer. The position transducers are also situated opposite the scale element separated by an air gap. The second component group furthermore has a compensation coupling. With the aid of the at least one position sensor, the first graduation is able to be scanned in order to determine the relative angular position between the component groups. Using the first, second, and third position transducers, the first graduation or a further graduation situated on the scale element is able to be scanned in order to determine a displacement of the scale element in a plane that is situated orthogonally to the axis of rotation, in particular. In addition, using the fourth, fifth, and sixth position transducers, the second graduation is able to be scanned for the quantitative determination of tilting (tilting angle) of the scale element or the axis of rotation about a tilting axis that lies in the plane or parallel to the plane. The first modular unit is connected with the aid of the compensation coupling to the second modular unit in a torsionally stiff but axially and radially flexible manner, so that the position sensor is situated in a torsionally stiff yet axially and radially flexible manner relative to the position transducers.

It should be understood that torsionally stiff indicates that the position of the position sensor relative to the position transducers with regard to the circumferential direction remains unchanged also under the usual loading of the compensation coupling. In contrast, because of the axial and radial flexibility of the compensation coupling, there is a change in the position of the position sensor relative to the position transducers during the usual loading of the compensation coupling. The position sensor is particularly situated so that it is (axially and radially) immovable relative to the scale element.

It should further be understood that position sensor and position transducer express that these components are installed on different modular units. The respective components (position sensor, position transducer) may have a different or an identical configuration.

The position sensor allows for an absolute determination of an angular position of the scale element relative to the second component group within and across a rotation. For example, this may be achieved in that the first graduation has an absolute code track or else in that a reference mark is applied to the scale element, which allows for an absolute determination of the angular position within a rotation in conjunction with an incremental graduation.

The second graduation may be arranged as an incremental graduation or an absolute graduation. An arrangement as an absolute graduation offers the advantage that the axial position of the scale element is also able to be determined directly after the angle measuring device has been switched on, which may be beneficial in the case of temperature-related axial displacements of the scale element, for instance.

An annular body, for example, which is able to be fastened to a driving collar, may be used as a scale element. However, it is alternatively also possible to apply the first and/or the second graduation directly on the driving collar.

The position sensor is able to be positioned opposite the scale element separated by an air gap that extends in the radial or axial direction. In the same manner, each position transducer may be placed opposite the scale element separated by an air gap that extends in the radial or axial direction, the size of the respective air gap possibly varying in such a case as a result of load-related displacements, shifting, or tilting under a deformation of the compensation coupling.

The first graduation and the optional, additional graduation may include regular structures that are situated in parallel next to one another along a first direction. The first direction has a directional component in the circumferential direction and the second graduation includes regular structures that are situated in parallel next to one another along a second direction. The second direction has a directional component in the axial direction.

The first direction along which the regular structures of the first graduation are placed next to one another may be identical with the circumferential direction. In the same or similar manner, the first direction may be inclined or extend at a slant in relation to the circumferential direction (but not perpendicular to the circumferential direction). In the same or similar manner, the second direction along which the regular structures of the second graduation are positioned next to one another may be identical with the axial direction (and thus be situated parallel to the axis of rotation). Similarly, the second direction may be inclined or extend at a slant with respect to the axial direction (but not perpendicular to the axial direction). The regular structures of the first graduation and the second graduation, for instance, may have an arrow-like orientation with respect to one another.

The second component group may include a light source, and the first graduation and the position sensor may be arranged such that the relative angular position between the component groups is able to be determined using an optical principle.

The displacement of the scale element in the plane may be determined using a magnetic principle. In this case, the structures of the graduation of the scale element are particularly arranged as magnetic structures, e.g., a locally defined series of magnetic north and south poles. In this configuration, the position sensor and/or the position transducers are arranged as magnetic sensors. The position sensor and/or the position transducers, for instance, may operate on the basis of a magnetoresistive principle or be arranged as Hall-effect transducers. Alternatively, the position transducers may also be based on an optical or inductive measuring principle, but a combination of the principles is possible as well, so that the first graduation is able to be scanned according to a different principle than the second graduation.

The first graduation and the second graduation may be at least partially disposed in a superposed manner. For example, the first graduation and the second graduation may be applied on a lateral side of a cylindrical scale element and the first graduation and the second graduation may be superposed with respect to the axial direction. In particular, the first graduation may be arranged as an optically scannable graduation and the second graduation as a magnetically scannable graduation.

In order to determine a displacement of the scale element, at least two of the position transducers are situated at an offset under a center angle about the axis of rotation of at least 90°. Accordingly, the first position transducer, for instance, is therefore disposed at an offset under a center angle about the axis of rotation of at least 90° relative to the second or relative to the third position transducer. A center angle thus should be understood as a central angle, the particular center point lying on the axis of rotation.

In order to determine tilting of the scale element about the tilting axis, at least two of the position transducers are disposed at an offset under a central angle about the axis of rotation of at least 90°. Here, the fourth position transducer, for instance, is situated at an offset under a center angle about the axis of rotation of at least 90° relative to the fifth or relative to the sixth position transducer.

The position transducers and optionally also the position sensor may be disposed along a circular line.

The second component group may include a housing, and the position sensor as well as the plurality of position transducers may be situated inside the housing.

The position sensor and the position transducers may be electrically connected to an electronic component, the electronic component being able to determine the angular position of the scale element, the displacement or the position of the scale element in the plane perpendicular to the axis of rotation, and tilting of the scale element. In addition, the electronic component may also be able to determine the axial position.

For spindles or rotary tables, which by nature have a correspondingly stiff configuration, such tilting is relatively minor and lies in ranges of under one angular minute relative to the ideal axis of rotation, e.g., 100 angular minutes down to 50 angular minutes. Such tilting thus also causes only minimal changes in position so that the position transducers must have a very high resolution in order to provide reliable statements or quantitative values with regard to the tilting. Since the axis of rotation may possibly rotate, the described tilting may lead to wobbling motions of the scale element, the wobbling motions being quantitatively recordable by the angle measuring device, especially also under consideration of the measured angular position.

The angle measuring device may have a memory component, which may be used as a data logger for storing information that is based on signals generated by the position sensor and/or the position transducers.

The position sensor by which the first graduation is scannable is situated at an offset with regard to the axial direction in relation to the position transducers by which the second graduation is scannable. In particular, the position sensor may be disposed at an offset from the fourth, fifth, and sixth position transducers.

At least the second graduation (or both graduations) may be applied on a lateral surface of a cylindrical scale element.

The angle measuring device thus not only makes it possible to detect an angular position but also axis displacements of a rotary table, for example, in an online manner. In particular, based on the measured values of the angular position and the position of the scale element in the plane perpendicular to the axis of rotation, it is possible to use a numerical control to correct the setpoint position during the machining or measuring process. The position of a workpiece, for instance, is therefore able to be corrected during the machining process. More specifically, the angle measuring device may be configured such that correction values are produced in an interaction with a numerical control that are based on the position data measured by the angle measuring device in conjunction with the absolute angular position.

The position transducers may have a resolution of less than 2 μm, in particular of less than 1 μm, in particular less than 750 nm. These values for the resolutions are able to be achieved both for determining the axial and the lateral positions, that is to say, in the plane perpendicular to the axis of rotation.

In other words, with the aid of the angle measuring device, shifting or movements of the scale element or the axis of rotation in the remaining five degrees of freedom can thus be detected in quantitative terms as a function of a measured angular position.

The scale element may include a further graduation, and the scale element may be arranged so that the first graduation is scannable according to an optical principle and the further graduation according to a magnetic principle. The first graduation and the further graduation may be at least partially positioned in a superposed manner. For example, the first graduation and the further graduation may be applied to a lateral side of a cylindrical scale element and the first graduation and the further graduation may have a superposed configuration with regard to the axial direction.

Further features and aspects of example embodiments of the present invention are described in more detail below with reference to the appended Figures.

DETAILED DESCRIPTION

Figure 1:
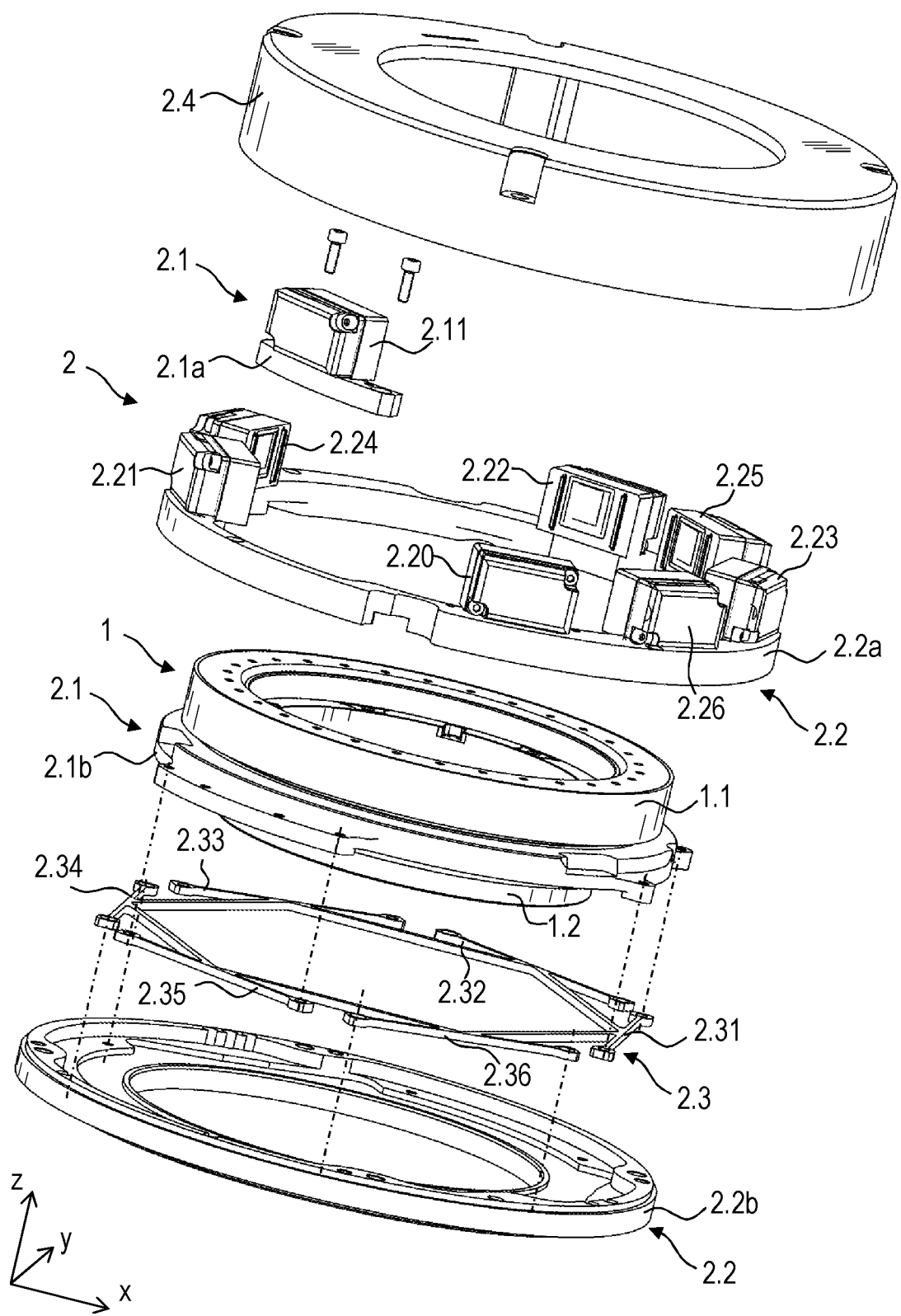
FIG. 1 is an exploded view of an angle measuring device.
Figure 2:
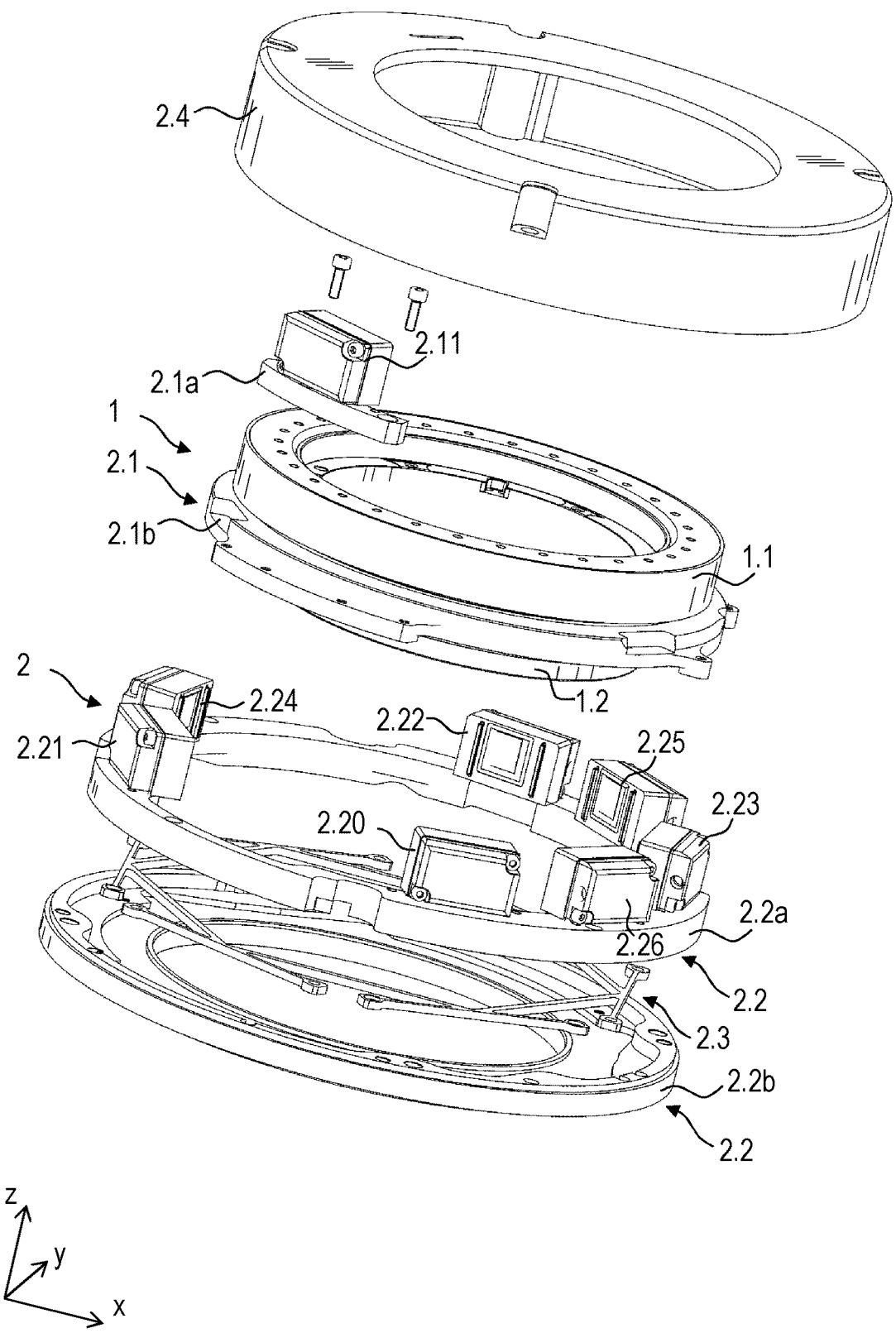
FIG. 2 is a further exploded view of the angle measuring device.
Figure 3:
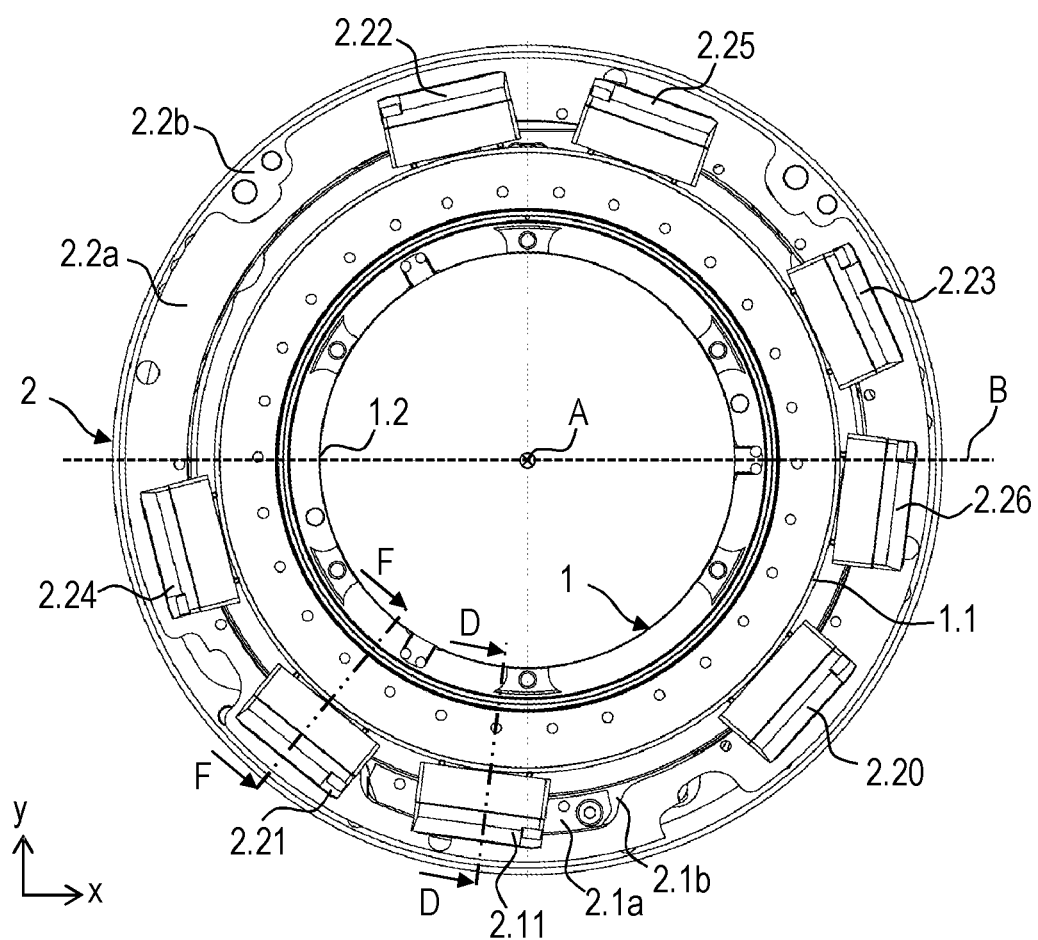
FIG. 3 is a top view of the angle measuring device.

FIGS. 1 and 2 are exploded views of an angle measuring device, or angle encoder, as it may be installed on a rotary table axle of a machine tool such as a milling machine. The angle measuring device includes a first component group 1 and a second component group 2. As illustrated in FIG. 3, first component group 1 is rotatable about an axis of rotation A relative to second component group 2, so that first component group 1 may function as a rotor and second component group 2 may consequently be referred to as a stator. In addition, the angle measuring device illustrated in FIG. 4 also includes a bearing 3, which is arranged as a rolling bearing.

Figure 4:
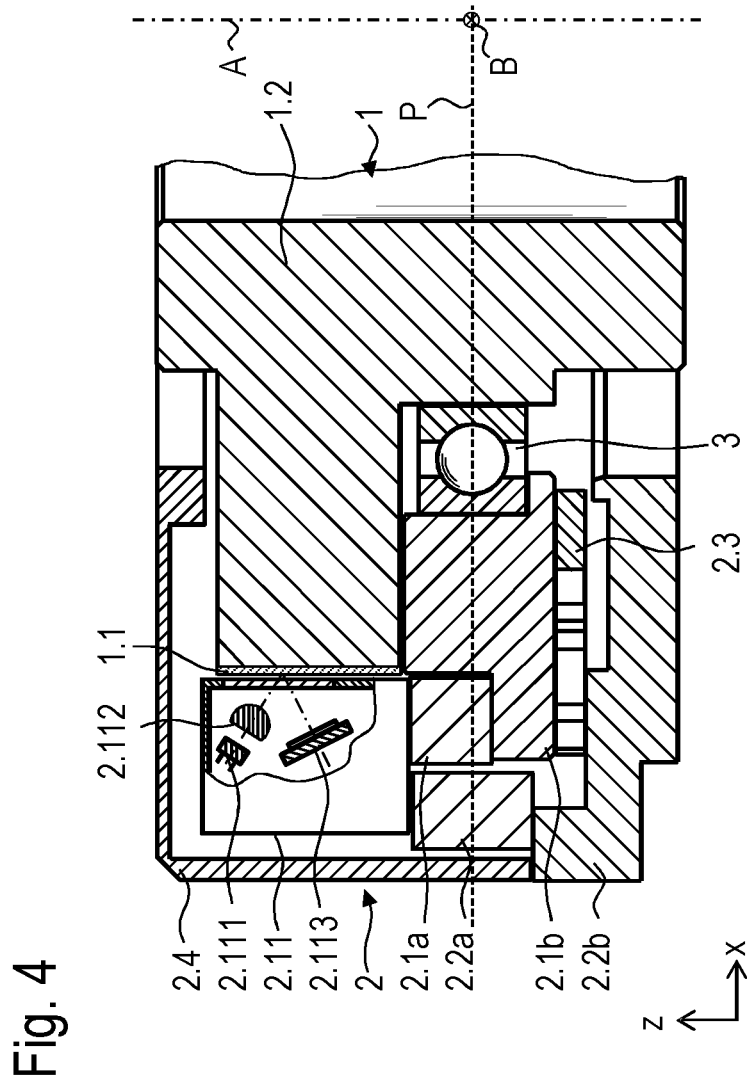
FIG. 4 is a partial cross-sectional view of the angle measuring device.
Figure 5:
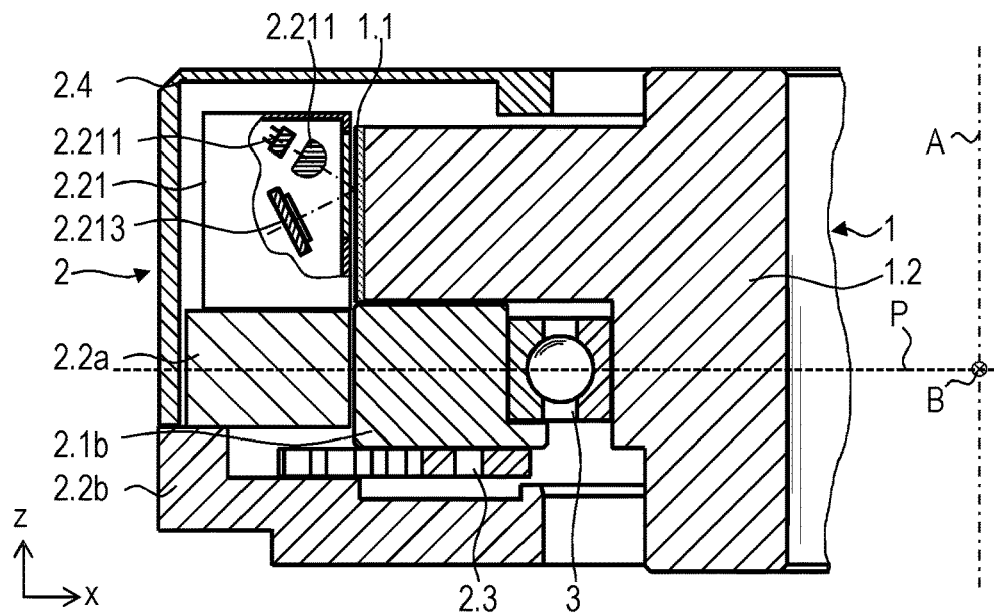
FIG. 5 a further partial cross-sectional view of the angle measuring device.

First component group 1 has a scale element 1.1, which is fixed in place in a torsionally fixed manner on a driving collar 1.2 (see FIG. 4 or 5, for example). Driving collar 1.2 is used for the accommodation of a shaft of a rotary table, for example, so that the shaft is connected to driving collar 1.2 in a rigid and torsionally fixed manner.

Second component group 2 has a first modular unit 2.1, which includes two parts and thus includes a first part 2.1a, which may be referred to as fastening jaws, and a second part 2.1b, which may be referred to as a bearing plate. Fastened to first part 2.1a is a position sensor 2.11, which is situated opposite scale element 1.1 separated by a radial air gap (see FIG. 4).

In addition, the second component group 2 has a second modular unit 2.2, which likewise includes two parts. Second modular unit 2.2 accordingly includes a first part 2.2a and a second part 2.2b, which may also be referred to as a flange. A plurality of position transducers 2.20 to 2.26 is mounted directly on first part 2.2a, which is arranged as a retaining ring. As illustrated in FIG. 5, position transducers 2.20 to 2.26 are situated opposite scale element 1.1 separated by a radial air gap. For example, the angle measuring device may include a first position transducer 2.21, a second position transducer 2.22, a third position transducer 2.23, a fourth position transducer 2.24, a fifth position transducer 2.25, a sixth position transducer 2.26, and a seventh position transducer 2.20. Position transducers 2.20 to 2.26 are situated at an offset from one another in circumferential direction u.

Second component group 2 includes a compensation coupling 2.3. It is used to compensate for displacements due to inherent production and assembly inaccuracies. With the aid of compensation coupling 2.3, first modular unit 2.1 is connected to second modular unit 2.2 in a torsionally stiff but axially and radially flexible manner. In the illustrated exemplary embodiment, first part 2.1b of first modular unit 2.1 is connected to three tabs 2.31, 2.33, 2.35 of compensation coupling 2.3 using screw connections, which are exemplarily indicated in FIG. 1 by dash-dot lines. In contrast, second part 2.2b of second modular unit 2.2 is connected to the three other tabs 2.32, 2.34, 2.36 of compensation coupling 2.3. In this manner, position sensor 2.11 is situated in a torsionally stiff but axially and radially resilient or flexible manner relative to the plurality of position transducers 2.20 to 2.26.

After compensation coupling 2.3 has been connected to first modular unit 2.1 and second modular unit 2.2 in the afore-described manner, first part 2.2a is able to be connected to second part 2.2b of second modular unit 2.2 using screws. Position sensor 2.11 as well as position transducers 2.20 to 2.26 are then axially situated at the level of scale element 1.1.

Based on FIG. 1, the installation situation of compensation coupling 2.3, in particular, is to be illustrated, while FIG. 2 is meant to illustrate the situation with regard to second modular unit 2.2, which includes first part 2.2a and second part 2.2b. In the course of the assembly, second modular unit 2.2 is axially moved over second part 2.1b of first modular unit 2.1.

In addition, second component group 2 includes a housing 2.4, which is connected to second part 2.2b of second modular unit 2.2 and may be rigidly fixed in place on a machine component for the measuring operation. Housing 2.4 is provided to protect the interior of the angle measuring device from environmental influences. In this context, seals may be provided between driving collar 1.2 and housing 2.4.

As described above, driving collar 1.2 is connected in a rigid and torsionally fixed manner to a rotatable shaft during the proper operation of the angle measuring device, and the housing or second part 2.2b of second modular unit 2.2 is connected to a stationary machine component. Eccentricities, wobbling motions, or axial displacements of the shaft relative to the machine component cause reaction forces in the angle measuring device, in particular in bearing 3. Compensation coupling 2.3, which is flexible or elastically deformable in the radial and axial direction, is provided to restrict the magnitude of the reaction forces. In contrast, compensation coupling 2.3 is torsionally stiff so that the accuracy of the measurement of the angular position is not adversely affected. Position sensor 2.11 is rigidly connected to the second part 2.1b of first modular unit 2.1. A deformation of compensation coupling 2.3 has no effect on the position of position sensor 2.11 relative to scale element 1.1. In contrast, position transducers 2.20 to 2.26 are (axially and radially) displaceable relative to scale element 1.1 within the scope of the elasticity of compensation coupling 2.3.

In the illustrated exemplary embodiment, position sensor 2.11 as well as position transducers 2.20 to 2.26 have a substantially identical configuration and are all disposed along a circular line. FIG. 4 is a cross-sectional view which includes position sensor 2.11 (through line D-D in FIG. 3), and FIG. 5 is a cross-sectional view which includes a position transducer 2.21 (through line F-F in FIG. 3) of position transducers 2.20 to 2.26. Each of the respective position transducers 2.11, 2.21 includes an LED 2.111, 2.211, a capacitor 2.112, 2.212, and a sensor element 2.113, 2.213. In this case, sensor element 2.113, 2.213 is arranged as what is generally referred to as an opto-ASIC on a circuit board. LED 2.111, 2.211 serving as a light source transmits light through capacitor 2.112, 2.212 onto scale element 1.1. LED 2.111, 2.211, capacitor 2.112, 2.212, and sensor element 2.113, 2.213 are allocated to the second component group 2 of angle measuring device, i.e. to the stator. In the illustrated exemplary embodiment, each position transducer 2.11, 2.20 to 2.26 has a housing in which corresponding sensor elements 2.113, 2.213 are situated. As an alternative, it is also possible to dispense with the housing, or multiple sensor elements may also be situated in one and the same housing. For example, a plurality of, or all, position transducers 2.11, 2.20 to 2.26 may also be mounted on one and the same circuit board.

Figure 6:
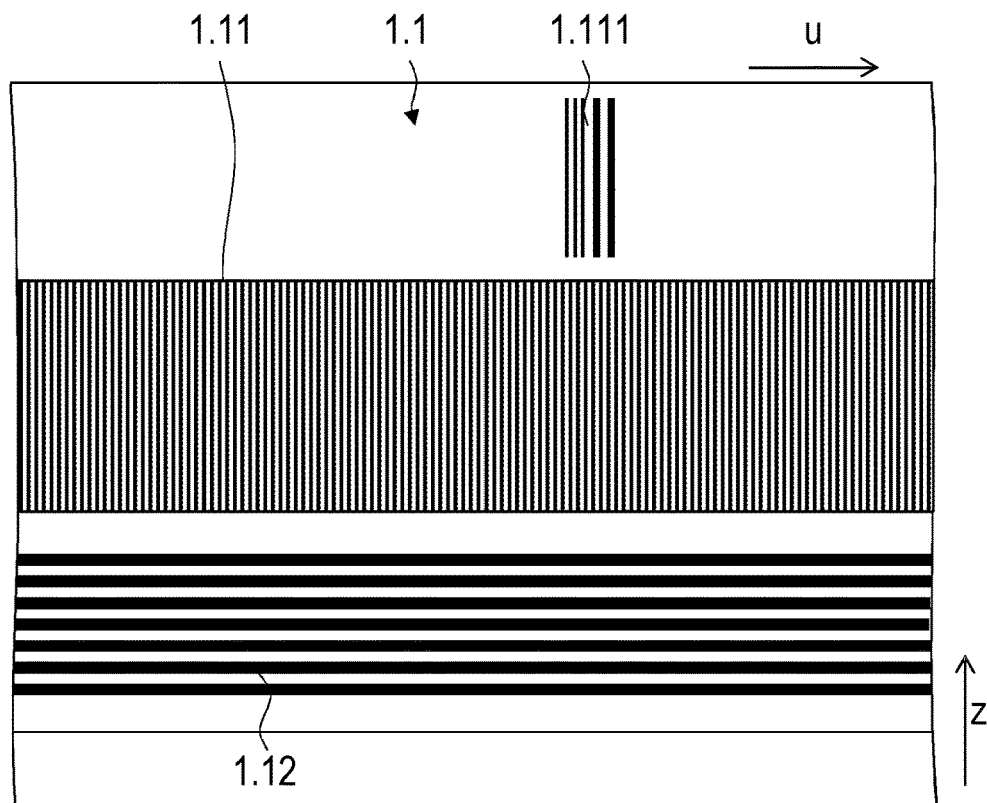
FIG. 6 is an enlarged view of a scale element of an angle measuring device according to an example embodiment.

In contrast, as mentioned above, scale element 1.1 is fastened to rotatable driving collar 1.2. As illustrated in FIG. 6, scale element 1.1 includes a first graduation 1.11 as well as a second graduation 1.12. In the illustrated exemplary embodiment, scale element 1.1 is arranged as a cylindrical or annular body on whose lateral side both second graduation 1.12 and first graduation 1.11 are situated, second graduation 1.12 being disposed at an offset from first graduation 1.11 with regard to the axial direction z.

FIG. 6 illustrates a section of a lateral surface of scale element 1.1. Second graduation 1.12 includes regular structures or lines, which are situated in parallel next to one another along a second direction, the second direction having a directional component in the axial direction. In the illustrated exemplary embodiment, the second direction is identical with axial direction z.

First graduation 1.11 includes regular structures or lines that are situated in parallel next to one another along a second direction, the second direction having a directional component in the axial direction. In the illustrated exemplary embodiment, the second direction extends parallel to axis of rotation A or parallel to direction z. In addition, first graduation 1.11 includes a reference mark 1.111.

In other words, first graduation 1.11 encompasses regular structures, which are arranged as lines in this case that are oriented in the second direction and disposed in parallel with one another. In the illustrated exemplary embodiment, the second direction extends parallel to axis of rotation A or parallel to direction z. Second graduation 1.12 likewise includes regular structures, which are arranged circumferentially in this case and whose circumferential longitudinal sides are oriented in the first direction and situated parallel to one another. The first direction extends in circumferential direction u.

In the illustrated exemplary embodiment, the structures of first graduation 1.11 and those of second graduation 1.12 are arranged as stripes that are reflective and non-reflective to light. Scale element 1.1 is able to modulate the irradiated light by its first graduation 1.11 according to the angular position of scale element 1.1 or driving collar 1.2. With the aid of second graduation 1.12, the irradiated light is modulated according to the axial position of scale element 1.1 or driving collar 1.2. The modulated light finally impinges upon photodetectors of sensor elements 2.113, 2.213 illustrated in FIGS. 4 and 5.

First graduation 1.11 may be scanned by position sensor 2.11 such that position sensor 2.11 is able to determine an angular position of scale element 1.1 in relation to position sensor 2.11. In the process, the angular position may be determined in absolute terms within and across a rotation. As illustrated in FIG. 6, an inherently incremental first graduation 1.11 may be used in this context, which is able to generate an absolute angular position across a rotation in conjunction with reference mark 1.111. First graduation 1.11 may alternatively have an absolute configuration, e.g., in the form of a pseudo random code or Gray code, within the sense of an encoding, or in other words include the generation of a unique code value. The signals from position sensor 2.11 are conveyed to an electronic component which is mounted in a suitable location in second component group 2. The electronic component generates the particularly digital values of the angular position. In the same or similar manner, position transducers 2.20 to 2.26 are electrically connected to the electronic component. As illustrated in FIG. 3, position transducers 2.20 to 2.26 are basically arranged in a pairwise manner (first pair 2.21, 2.24, second pair 2.22, 2.25, third pair 2.23, 2.26). In the illustrated exemplary embodiment, first graduation 1.11 is scanned by first position transducer 2.21, second position transducer 2.22, and third position transducer 2.23.

Second graduation 1.12 is scanned by fourth position transducer 2.24, fifth position transducer 2.25, and sixth position transducer 2.26, and these position transducers 2.24, 2.25, 2.26 are also able to determine the axial position of scale element 1.1. Position transducer 2.20, which is not part of one of the aforementioned pairs, is also used for scanning first graduation 1.11 in order to carry out a method for ascertaining a correction value.

In the electronic component, the absolute angular position of driving collar 1.2 is also allocated to the axial position.

A suitable linkage of the position signals of first position transducer 2.21, second position transducer 2.22, and third position transducer 2.23 in the electronic component allows for a determination of the position of scale element 1.1 in a plane P, which is oriented perpendicular to axis of rotation A, i.e., the x, y coordinates of the actual position of axis of rotation A. This position, which may also be referred to as the lateral position, depends on the loading of the individual rotary table during the machining. In addition, the absolute angular position of driving collar 1.2 is also allocated to the current lateral position.

With the aid of the angle measuring device and a suitable linkage of the position signals of fourth position transducer 2.24, fifth position transducer 2.25, and sixth position transducer 2.26, it is also possible to determine the extent of tilting of scale element 1.1 about a tilting axis B that lies in a plane P, and also the extent and the direction of wobbling motions. Plane P is oriented perpendicular to axis of rotation A.

Using the angle measuring device, it is possible, in particular in the case of rotary tables, to determine the absolute angular position of driving collar 1.2 and to measure the lateral and axial position of driving collar 1.2 as a function of the absolute angular position. Because the mentioned rotary tables have a very stiff construction as it is, position measurements that lie in a μm range or lower are obtained in this case. A high resolution is therefore required, in particular of position sensor 2.11 and position transducers 2.20 to 2.26. In the same or similar manner, tilting of axis of rotation A relative to housing 2.4 about tilting axis B is measurable.

The further processed position signals are finally output via a cable to an additional device such as a control device of a machine.

In the illustrated exemplary embodiment, position sensor 2.11 as well as position transducers 2.20 to 2.26 are thus position transducers which sense an angular position or an axial position.

Figure 7:
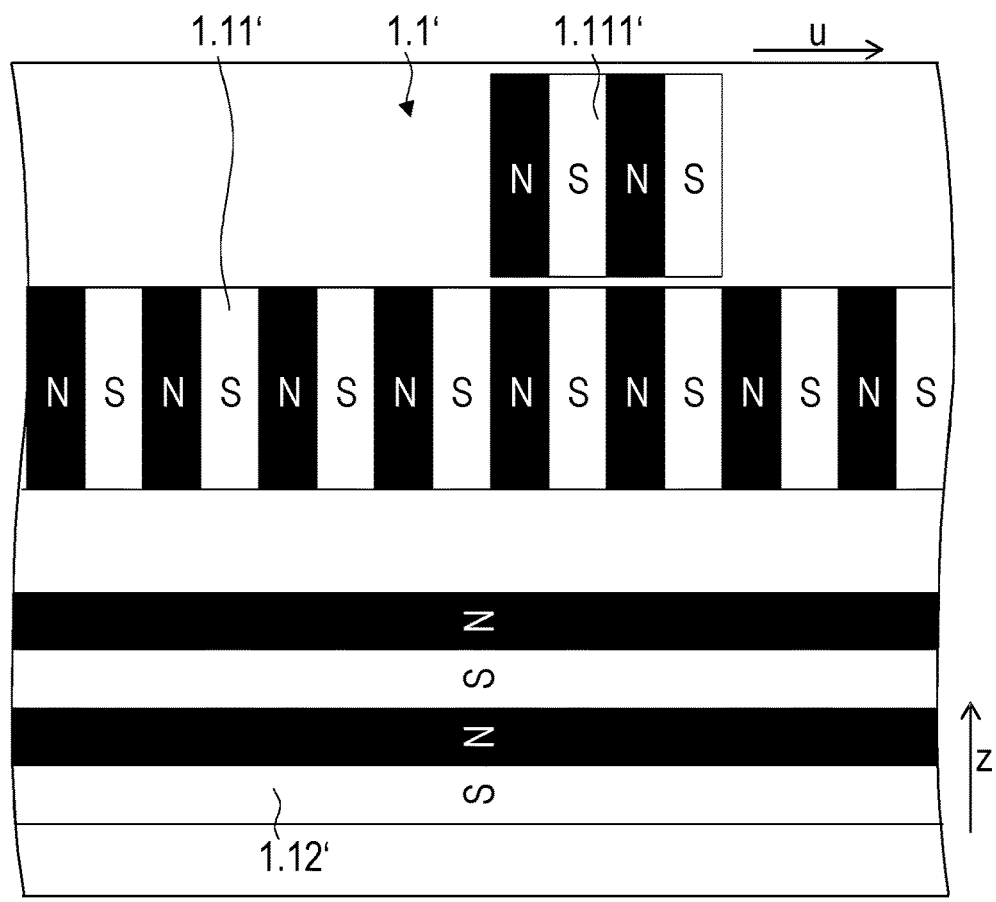
FIG. 7 is an enlarged view of a scale element of an angle measuring device according to another example embodiment.

According to another exemplary embodiment as illustrated in FIG. 7, which likewise shows a lateral side view of a scale element 1.1', scale element 1.1' includes a first graduation 1.11', which has regular structures or lines (black and white rectangles in FIG. 7) that are situated in parallel next to one another along the first direction, the first direction having a directional component in circumferential direction u. In the illustrated exemplary embodiment, the first direction is identical with circumferential direction u. In addition, first graduation 1.11' includes a reference mark 1.111'.

Second graduation 1.12' includes regular structures or lines (black and white rectangles in FIG. 7) that are situated in parallel next to one another along the second direction, the second direction having a directional component in the axial direction. In the illustrated exemplary embodiment, the second direction is identical with axial direction z.

The structures in the illustrated further exemplary embodiment are arranged as magnetic north and south poles.

Accordingly, the position sensor as well as the position transducers are arranged as magnetic transducers in this exemplary embodiment. The position sensor and the position transducers may have magnetoresistive detectors. These may be arranged as magnetoresistive structures on a glass substrate, for example.

Figure 8:
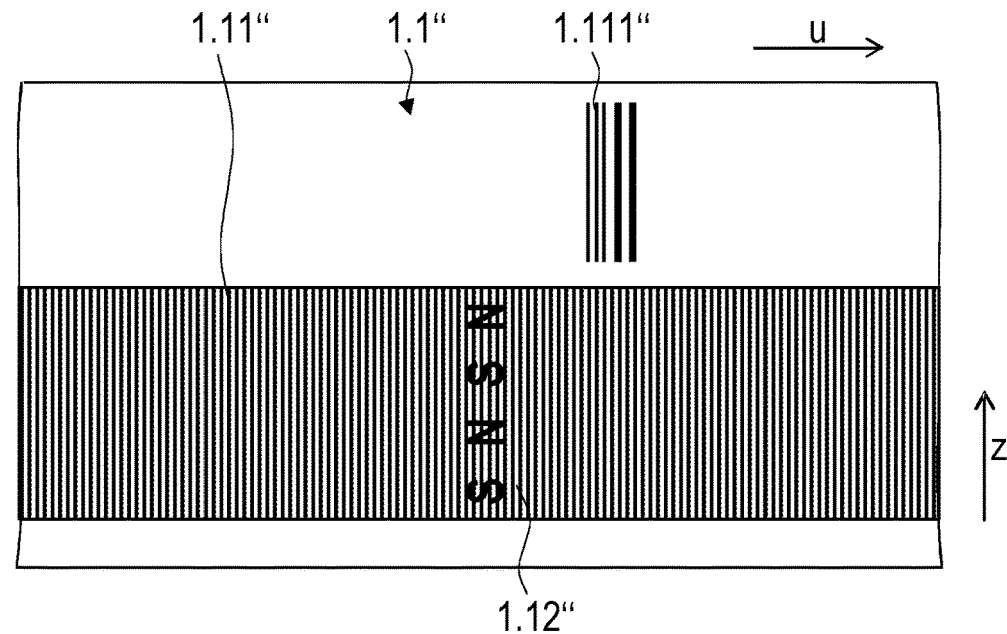
FIG. 8 is an enlarged view of a scale element of an angle measuring device according to a further example embodiment.

An additional exemplary embodiment is described with reference to FIG. 8. FIG. 8 is a view of a lateral surface of a scale element 1.1", which has a relatively small extension in the axial direction. Scale element 1.1" includes a first graduation 1.11", having regular structures or lines that are situated in parallel next to one another along the first direction, the first direction having a directional component in circumferential direction u. In this example embodiment, the first direction is identical with circumferential direction u. In addition, first graduation 1.11" has a reference mark 1.111", which likewise includes structures or lines. The structures of first graduation 1.11" and reference mark 1.111" are arranged as stripes that are reflective and non-reflective to light, similar to the above-described exemplary embodiment.

In contrast, second graduation 1.12" includes regular structures or lines that are situated in parallel next to one another along the second direction, the second direction having a directional component in the axial direction. The second direction is identical with axial direction z. The circumferential structures (comparable to magnetic graduation 1.12' of the exemplary embodiment described above) of second graduation 1.12" are arranged as magnetic north and south poles. First graduation 1.11" and second graduation 1.12" are at least partially situated in a superposed manner so that the axial space requirement of first graduation 1.11" and second graduation 1.12" is able to be reduced. This configuration also offers the advantage that tilting about tilting axis B has barely any effect on the measurement inasmuch as both graduations 1.11", 1.12" are scanned at virtually the same axial height or in one and the same circumferential region.

Position sensor 2.11 may scan first graduation 1.11" according to an optical principle, as illustrated in FIG. 4, while the position transducers operate according to a magnetic principle. In the third-described exemplary embodiment, the angular position is therefore optically sensed and the tilting of scale element 1.1" or the displacement of scale element 1.1" in plane P is sensed using a magnetic principle.

What is claimed is:

1. An angle measuring device, comprising:
   a first component group including a scale element having a first graduation and a second graduation;
   a second component group including a first modular unit, having a position sensor arranged opposite the scale element separated by an air gap, a second modular unit, having first, second, third, fourth, fifth, and sixth position transducers arranged opposite the scale element separated by an air gap, and a compensation coupling; and
   a bearing, the first component group and the second component group being rotatable relative to each other about an axis of rotation via the bearing;
   wherein the position sensor is adapted to scan the first graduation to determine a relative angular position between the first component group and the second component group;
   wherein the first, second, and third position transducers are adapted to scan the first graduation or a further graduation provided on the scale element to determine a displacement of the scale element in a plane;
   wherein the fourth, fifth, and sixth position transducers are adapted to scan the second graduation to determine tilting of the scale element about a tilting axis that is located in the plane or parallel to the plane; and
   wherein the first modular unit is connected to the second modular unit by the compensation coupling in a torsionally stiff but axially and radially flexible manner, so that the position sensor is arranged in a torsionally stiff but axially and radially flexible manner relative to the position transducers.

2. The angle measuring device according to claim 1, wherein the first graduation includes regular structures that are arranged in parallel next to one another along a first direction, the first direction having a directional component in a circumferential direction, and the second graduation includes regular structures that are arranged in parallel next to one another along a second direction, the second direction having a directional component in an axial direction.

3. The angle measuring device according to claim 1, wherein the second component group includes a light source, the first graduation and the position sensor arranged such that a relative angular position between the first component group and the second component group is optically determinable.

4. The angle measuring device according to claim 1, wherein the displacement of the scale element in the plane is magnetically determinable.

5. The angle measuring device according to claim 1, wherein the first graduation and the second graduation are at least partially superposed.

6. The angle measuring device according to claim 1, wherein at least two of the position transducers are arranged at an offset under a center angle about the axis of rotation of at least 90° to determine a displacement of the scale element.

7. The angle measuring device according to claim 1, wherein at least two of the position transducers are arranged at an offset under a center angle about the axis of rotation of at least 90° to determine tilting of the scale element about the tilting axis.

8. The angle measuring device according to claim 1, wherein at least three of the position transducers are arranged along a circular line.

9. The angle measuring device according to claim 1, wherein the second component group includes a housing, the position sensor and the position transducers being arranged inside the housing.

10. The angle measuring device according to claim 1, wherein the scale element is cylindrical form, and the first graduation and/or the second graduation is arranged on a lateral surface of the scale element.

11. The angle measuring device according to claim 1, wherein the position sensor is arranged at an offset in relation to the fourth, fifth, and sixth position transducers with respect to an axial direction.

* * * * *